UNITED STATES PATENT OFFICE.

JULIUS HERBABNY, OF OFFENBACH-ON-THE-MAIN, GERMANY, ASSIGNOR TO K. OEHLER, ANILIN AND ANILINFARBEN-FABRIK, OF SAME PLACE.

BLACK POLYAZO DYE.

SPECIFICATION forming part of Letters Patent No. 644,292, dated February 27, 1900.

Application filed December 21, 1899. Serial No. 741,076. (Specimens.)

*To all whom it may concern:*

Be it known that I, JULIUS HERBABNY, doctor of philosophy, residing at Biebererstrasse 32, Offenbach-on-the-Main, in the Grand Duchy of Hesse, Germany, have invented new and useful Improvements in Black Polyazo Dyestuffs, (for which application for patent, numbered O. 3,272, was filed in Germany on October 23, 1899, by the firm of K. Oehler at Offenbach-on-the-Main,) of which the following is a specification.

By subjecting the monoazo dyes which result from the action of amido-naphthol-sulfonic acids and toluylene-diamin-sulfonic acids ($CH_3:NH_2:NH_2:SO_3H$ 1:2:6:4 or 1:2:4:6) to the action of diazo compounds there are two places in the molecule where they can enter into reaction either in the radical of the benzene or in that of the naphthalene. Now my investigations have led to the discovery that in the present case the reaction takes place in the naphthalene radical. Thus by employing tetrazo compounds intermediate products are first obtained, being coupled in the naphthalene radical, and which may be further combined either with one molecule of the same or of another monoazo dye or with one molecule of an amin, phenol, amidophenol, or their sulfonic or carboxylic acids. Thus valuable coloring-matters result which dye cotton without mordants and possess a considerable coloring power. They go easily on the fiber, giving good even shades, resisting well soaping, though readily soluble. Most of them can be discharged with either bisulfite and zinc-dust or with stannous chlorid, so that pure-white discharge effects can be obtained. They can also be diazotized and developed on the fiber and combined with diazo compounds, thus yielding heavy dark and very fast shades.

In the following I shall give an example in what manner the process is to be best carried out for obtaining dyestuffs from paradiamins and two molecular proportions of the monoazo dyestuff of 2:8-amido-naphthol-sulfonic acids and toluylene diamin sulfonic acids.

The monoazo dyestuffs are prepared in the usual manner by combining in an acetic acid or soda alkaline solution the amido-naphthol-sulfonic acids, diazotized in the usual way, with the sulfonic acids of the meta-diamins. The parts are by weight.

Prepare in the well-known manner from 18.4 parts of benzidin or from the equimolecular proportion of tolidin or dianisidin the tetrazo compound and pour it while keeping alkaline into a solution from one hundred parts of the sodium salt of the monoazo dyestuff derived from the amido-naphthol-monosulfonic acid G and toluylene-diamin-sulfonic acid. After twenty-four hours, when the formation of the dyestuff is finished, heat to about 80° to 90° centigrade, precipitate with common salt, filter, press, and dry.

The dyestuff thus obtained forms a dark-gray to black powder with a metallic sheen, which is readily soluble in water with a deep blue-black color, and which dyes unmordanted cotton a full black. By using tolidin or dianisidin dyestuffs result of similar properties, but of a greenish shade, and by employing 2:8-amido-naphthol-disulfonic acid products are obtained, being more readily soluble.

Now what I claim, and desire to secure by Letters Patent, is the following:

As new articles of manufacture, the polyazo dyestuffs adapted for dyeing cotton a fast black which result from the combination of one molecular proportion of a paradiamin with two molecular proportions of a monoazo dye as obtained by combining diazotized 2:8-amido-naphthol-sulfonic acid and toluylene-diamin-sulfonic acid, according to the following formula, Para-diamin ⟨ Monoazo dye from diazotized 2:8-amido-naphthol sulfonic acid + toluylene diamin sulfonic acid,
Monoazo dye from diazotized 2:8-amido-naphthol sulfonic acid + toluylene diamin sulfonic acid, substantially as hereinbefore described; which form gray to brown-black powders, showing a metallic luster, being readily soluble in water, and on addition of hydrochloric acid to the aqueous solution a bluish-black precipitate results, soda-lye changes the color of the aqueous solution into reddish violet; concentrated sulfuric acid yields a pure blue solution from which on adding water a blackish-violet precipitate falls down.

In testimony whereof I have signed my name to this specification in the presence of two subscribing witnesses.

JULIUS HERBABNY.

Witnesses:
RICHARD GUENTHER,
CARL GRUND.